United States Patent
Davidson et al.

(10) Patent No.: US 8,471,844 B2
(45) Date of Patent: Jun. 25, 2013

(54) STREAMING GEOMETRY FOR USE IN DISPLAYING AND EDITING 3D IMAGERY

(75) Inventors: Alan Davidson, Sherman Oaks, CA (US); Robert B. Engle, Encino, CA (US); Clint Chua, Alhambra, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 829 days.

(21) Appl. No.: 12/357,389

(22) Filed: Jan. 21, 2009

(65) Prior Publication Data

US 2009/0262108 A1    Oct. 22, 2009

Related U.S. Application Data

(60) Provisional application No. 61/022,211, filed on Jan. 18, 2008.

(51) Int. Cl.
    *G06T 15/00* (2006.01)
(52) U.S. Cl.
    USPC .......................................................... 345/419
(58) Field of Classification Search
    None
    See application file for complete search history.

(56) References Cited

U.S. PATENT DOCUMENTS

| | | | |
|---|---|---|---|
| 4,881,067 A * | 11/1989 | Watanabe et al. | ............. 345/440 |
| 5,440,682 A | 8/1995 | Deering | |
| 5,818,959 A | 10/1998 | Webb et al. | |
| 5,905,568 A | 5/1999 | McDowell et al. | |
| 6,208,348 B1 | 3/2001 | Kaye | |
| 6,215,500 B1 | 4/2001 | Deering | |
| 6,515,659 B1 | 2/2003 | Best et al. | |
| 6,525,722 B1 | 2/2003 | Deering | |
| 6,563,504 B1 | 5/2003 | Rose et al. | |
| 6,574,361 B1 | 6/2003 | Kawakami et al. | |
| 6,686,926 B1 | 2/2004 | Kaye | |
| 7,007,295 B1 | 2/2006 | Rose et al. | |
| 7,102,633 B2 | 9/2006 | Kaye et al. | |
| 7,116,323 B2 | 10/2006 | Kaye et al. | |
| 7,116,324 B2 | 10/2006 | Kaye et al. | |
| 7,292,250 B2 | 11/2007 | Sepulveda | |
| 7,519,449 B2 * | 4/2009 | Rhee et al. | ..................... 700/182 |
| 7,545,974 B2 | 6/2009 | Jeong et al. | |

(Continued)

OTHER PUBLICATIONS

Engle; "Beowulf 3D: A Case Study"; Stereoscopic Displays and Applications XIX; Feb. 29, 2008; Proceedings of the SPIE; vol. 6803, pp. 68030R-68030R-9 (2008); SPIE—The International Society of Optical Engineering.

(Continued)

*Primary Examiner* — Hau Nguyen
*Assistant Examiner* — Ryan M Gray
(74) *Attorney, Agent, or Firm* — Fitch, Even, Tabin & Flannery, LLP

(57) ABSTRACT

Method and systems are provided using streaming geometry in 3D imagery production. In one implementation a method for use in the display of 3D video images comprises receiving a first set of data corresponding to an output from a layout in a production pipeline, generating geometry data for one or more objects represented within the first set of data, merging the geometry data for each of the one or more objects to create one or more merged files, generating a table of contents, wherein the table of contents specifies the location of the geometry data for each of the one or more objects within the one or more merged files and storing the geometry data and the table of contents to a memory device for subsequent retrieval.

18 Claims, 10 Drawing Sheets

U.S. PATENT DOCUMENTS

| | | | |
|---|---|---|---|
| 7,567,252 B2 | 7/2009 | Buck et al. | |
| 8,199,156 B2 | 6/2012 | Antoine | |
| 8,243,123 B1 | 8/2012 | Geshwind et al. | |
| 2004/0153824 A1 | 8/2004 | Devarajan et al. | |
| 2004/0247176 A1 | 12/2004 | Aucsmith et al. | |
| 2005/0062739 A1 | 3/2005 | Balmelli et al. | |
| 2005/0063596 A1 | 3/2005 | Yomdin et al. | |
| 2005/0117215 A1 | 6/2005 | Lange | |
| 2006/0242550 A1 | 10/2006 | Rahman et al. | |
| 2007/0143979 A1 | 6/2007 | Townsend et al. | |
| 2007/0279412 A1 | 12/2007 | Davidson et al. | |
| 2007/0279415 A1 | 12/2007 | Sullivan et al. | |
| 2008/0018647 A1* | 1/2008 | Bunnell | 345/426 |
| 2008/0059578 A1 | 3/2008 | Albertson et al. | |
| 2008/0066023 A1 | 3/2008 | Xu et al. | |
| 2008/0170118 A1 | 7/2008 | Albertson et al. | |
| 2008/0304705 A1 | 12/2008 | Pomerleau et al. | |
| 2009/0041368 A1 | 2/2009 | Leberl et al. | |
| 2009/0213034 A1 | 8/2009 | Wu et al. | |
| 2009/0262184 A1 | 10/2009 | Engle et al. | |
| 2009/0289941 A1 | 11/2009 | Davidson et al. | |
| 2010/0277568 A1 | 11/2010 | Yun et al. | |
| 2010/0290697 A1 | 11/2010 | Benitez et al. | |
| 2011/0050853 A1 | 3/2011 | Zhang et al. | |
| 2011/0257776 A1 | 10/2011 | Townsend et al. | |

OTHER PUBLICATIONS

USPTO; U.S. Appl. No. 12/357,386; Office Action mailed Dec. 21, 2011.

USPTO; U.S. Appl. No. 12/357,391; Office Action mailed Dec. 7, 2011.

USPTO; Office Action issued in U.S. Appl. No. 12/357,386, mailed Aug. 28, 2012, 13 pages.

USPTO; Notice of Allowance issued in U.S. Appl. No. 12/357,386, mailed Jan. 14, 2013, 8 pages.

USPTO; Final Office Action issued in U.S. Appl. No. 12/357,391, mailed Apr. 11, 2012, 29 pages.

USPTO; Final Office Action issued in U.S. Appl. No. 12/357,386, mailed May 2, 2012, 15 pages.

* cited by examiner

STREAMING GEOMETRY FOR USE IN DISPLAYING AND EDITING 3D IMAGERY

This application claims the benefit of U.S. Provisional Application No. 61/022,211, filed Jan. 18, 2008, entitled 3D MOVIE PRODUCTION, which is incorporated in its entirety herein by reference.

This application is related to U.S. application Ser. No. 12/357,386, filed herewith, entitled METHOD AND APPARATUS FOR DISPLAYING AND EDITING 3D IMAGERY, which is incorporated in its entirety herein by reference.

BACKGROUND OF THE INVENTION

1. Field of the Invention

The present invention relates generally to 3D movie production, and more specifically to viewing and editing 3D images.

2. Discussion of the Related Art

Recently there has been great interest in the production of 3D motion pictures. With the advances made in 3D-capable digital theaters and the success of movies released in 3D, there has been increasing interest in producing titles capable of being released in 3D.

Currently, the production of these movies is costly, and requires a large amount of time, and budget. The production pipeline requires the involvement of a large number of artists. Production may take months because of the limitations in the 3D production technology.

This application addresses these limitations by introducing a new method of viewing and editing 3D images, and titles.

SUMMARY OF THE INVENTION

Several embodiments of the invention provide various systems and methods used in the production of 3D images.

In one embodiment, the invention may be characterized as a method for use in the display of 3D video images comprising receiving a first set of data corresponding to an output from a layout in a production pipeline, generating geometry data for one or more objects represented within the first set of data, merging the geometry data for each of the one or more objects to create one or more merged files, generating a table of contents, wherein the table of contents specifies the location of the geometry data for each of the one or more objects within the one or more merged files and storing the geometry data and the table of contents to a memory device for subsequent retrieval.

In another embodiment, the invention may be characterized as a computer-readable storage medium storing a computer program, the computer program adapted to cause a processor based system to execute steps comprising receiving a first set of data corresponding to an output from a layout in a production pipeline, generating geometry data for one or more objects represented within the first set of data, merging the geometry data for each of the one or more objects to create one or more merged files, generating a table of contents, wherein the table of contents specifies the location of the geometry data for each of the one or more objects within the one or more merged files and storing the geometry data and the table of contents to a memory device for subsequent retrieval.

In yet another embodiment, the invention may be characterized as a system comprising means for receiving a first set of data corresponding to an output from a layout in a production pipeline, means for generating geometry data for one or more objects represented within the first set of data, means for merging the geometry data for each of the one or more objects to create one or more merged files, means for generating a table of contents, wherein the table of contents specifies the location of the geometry data for each of the one or more objects within the one or more merged files and means for storing the geometry data and the table of contents to a memory device for subsequent retrieval.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
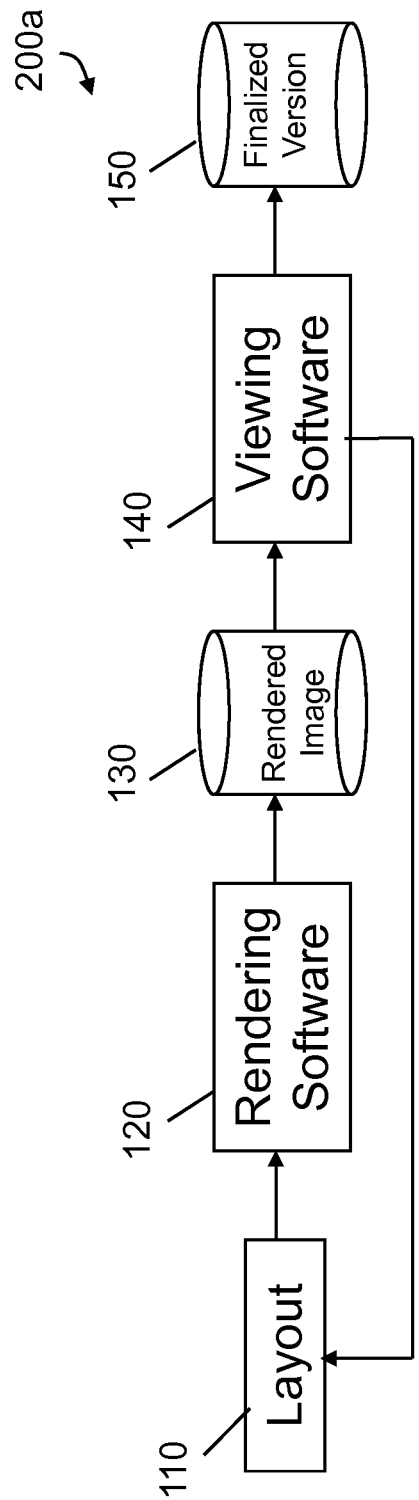
FIG. 1 illustrates a flow diagram of a conventional method for generating, displaying and editing 3D imagery during movie production.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Production of 3D movies includes generating 3D imagery or 3D images based on the 2D version of the title, and modifying aspects of the 3D imagery to generate a movie that can be played and enjoyed in a wide variety of 3D capable digital theaters. The modifications focus on creating a 3D experience that is realistic and does not result in discomfort for the viewer of the 3D movie. These goals require that the 3D imagery generated be closely reviewed and modified to provide images that are adapted for the human eye.

Traditionally, this involves generating 3D imagery based on a layout of the movie, and rendering the images. Next, the rendered images are forwarded to one or more individuals who review the images using a viewing and projection system and provide feedback regarding the viewability of the rendered images. The artist then must edit the original layout to correct the issues that were present in the rendered 3D image, and the images are then re-rendered. This process is reiterated until the images are optimal for being viewed by the human eye.

FIG. 1 describes the process of generating, displaying and editing 3D imagery during movie production, according to the methods currently used by others in the movie production field. The process begins with layout and animation data 110 generated by several artists. Traditionally, the artists create the animation data and layout according to assumptions about how the images will look after the have been rendered into 3D images. The layout and animation data is received as input in rendering software 120, where the layout data is rendered in a 3D fashion, and outputted as a rendered sequence of 3D images 130. It should be noted that the process of rendering images in 3D is a time consuming and costly process.

Next, the rendered images are forwarded to viewing software 140 and displayed to a user for reviewing. At this stage, a reviewer (or multiple reviewers in some cases) views the 3D images to decide whether the 3D sequence is of an optimal quality to be displayed on a variety of 3D capable theater systems, and provide a realistic and enjoyable experience for the viewer. Typically, the 3D sequence comprises several factors such as depth, convergence, and interocular offset of the cameras that must be optimized to ensure that the resulting 3D sequence or movie is realistic and does not cause discomfort. Once the reviewer takes note of the aspects of the rendered sequence that must be edited, the comments are forwarded back to the artists. The artists then edit the layout data 110 to accommodate the comments provided by the reviewers and forward the modified layout to the rendering software 120. The process is then repeated until the rendered 3D sequence or movie is at a satisfactory level of quality, and the final rendered sequence is stored as the finalized version 150.

Typically, this process involves a large number of artists and reviewers, and requires that the images be rendered each time after modifications are made to the layout, and typically, the process is repeated a number of times until the rendered sequence is at a satisfactory level of quality. This leads to a long and costly production process.

For example, typical 3D movie production may include a "large" camera team of 5-8 artists responsible for setting up the cameras for shots assigned to them. A common technique to create comfortable stereoscopic material is to ensure that harsh transitions in depth are avoided when cutting from one shot to the next. Typically, this would require reviewing pre-rendered stereo clips for each shot, reviewing them in the context of the film sequences and giving feedback. The process was highly iterative, with completion of an entire sequence often taking a week or more.

Present embodiments recognize a need for a movie production process that allows for a more efficient method of viewing and editing 3D imagery used to create 3D movies. As such, present embodiments describe a method of real-time interactive reviewing and editing of 3D imagery, which leads to a highly efficient 3D production process. 3D imagery may refer to 3D images or pictures presented in a stereoscopic manner. In one embodiment, 3D imagery comprises temporal images that change frame to frame, resulting in animation. In one embodiment, 3D imagery is displayed in near real-time or in real-time without use of an offline rendering process.

One or more of the present embodiments provide a more interactive approach that provides more creative flexibility, while increasing the efficiency of the camera creation process. For example, one or more embodiments allow the user or reviewer to visualize all aspects of the 3D film in a live, interactive session rather than requiring the iterative, pre-rendered approach. For example, in one embodiment, by providing software hooks allowing the use of standard OpenGL stereo drawing code one or more embodiments provide the ability to view live sessions in a 3D theater or display system and the ability to dial the camera parameters directly. These features are described in more detail with respect to the figures described below.

Figure 2:
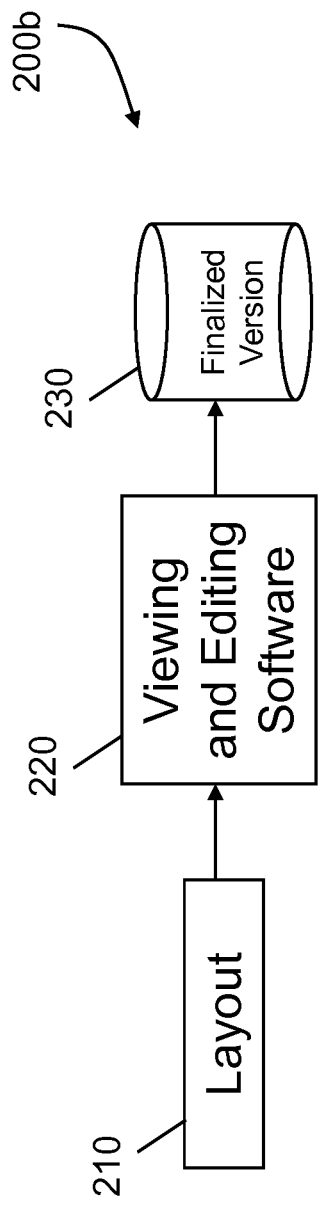
FIG. 2 illustrates a flow diagram of a method for generating, displaying and editing 3D imagery during movie production, according to one or more embodiments.

Referring first to FIG. 2, the general process of generating 3D imagery is illustrated according to one or more embodiments. In step 210, the process begins with an output from a layout in a production pipeline. In one embodiment, the layout data may be a rough layout, or a final layout of a movie. In one embodiment, the layout and animation data of step 210 provides digital data corresponding to a 2D movie or layout data such as scene data. 3D scene data may be referred to as data modeled in a virtual world, whereas 3D imagery may be referred to as 3D images that are displayed stereoscopically. The data may represent live action movie footage and/or computer generated (CG) data. Next, in step 220, the layout and animation data is used to generate and display 3D imagery at a machine hosting the viewing and editing software as provided in several embodiments of the invention. In one or more embodiments, the 3D imagery may be played back in real-time or near real-time in a stereoscopic manner. In several embodiments, the scene data is animated scene data. That is, in one or more embodiments, the displayed scene data has a temporal characteristic and changes from frame to frame. Next, the artists or another user uses the editing software to make real time modifications to the displayed 3D imagery corresponding to animated scene data to create 3D imagery which can be displayed using 3D-display systems, and which is adapted to provide a realistic and enjoyable experience for the viewer without causing discomfort to the human eye. Several of the properties of the generated 3D imagery, including depth, convergence, interocular offset, etc. may be modified at this stage to provide a 3D an imagery sequence that is optimal for viewing. The 3D imagery sequence is then stored as the finalized version 230.

Therefore, the present embodiments eliminate the need for repeated rendering of the 3D images, and reviewing of the 3D imagery, and therefore providing for a cost efficient and fast production of 3D titles.

Figure 3:
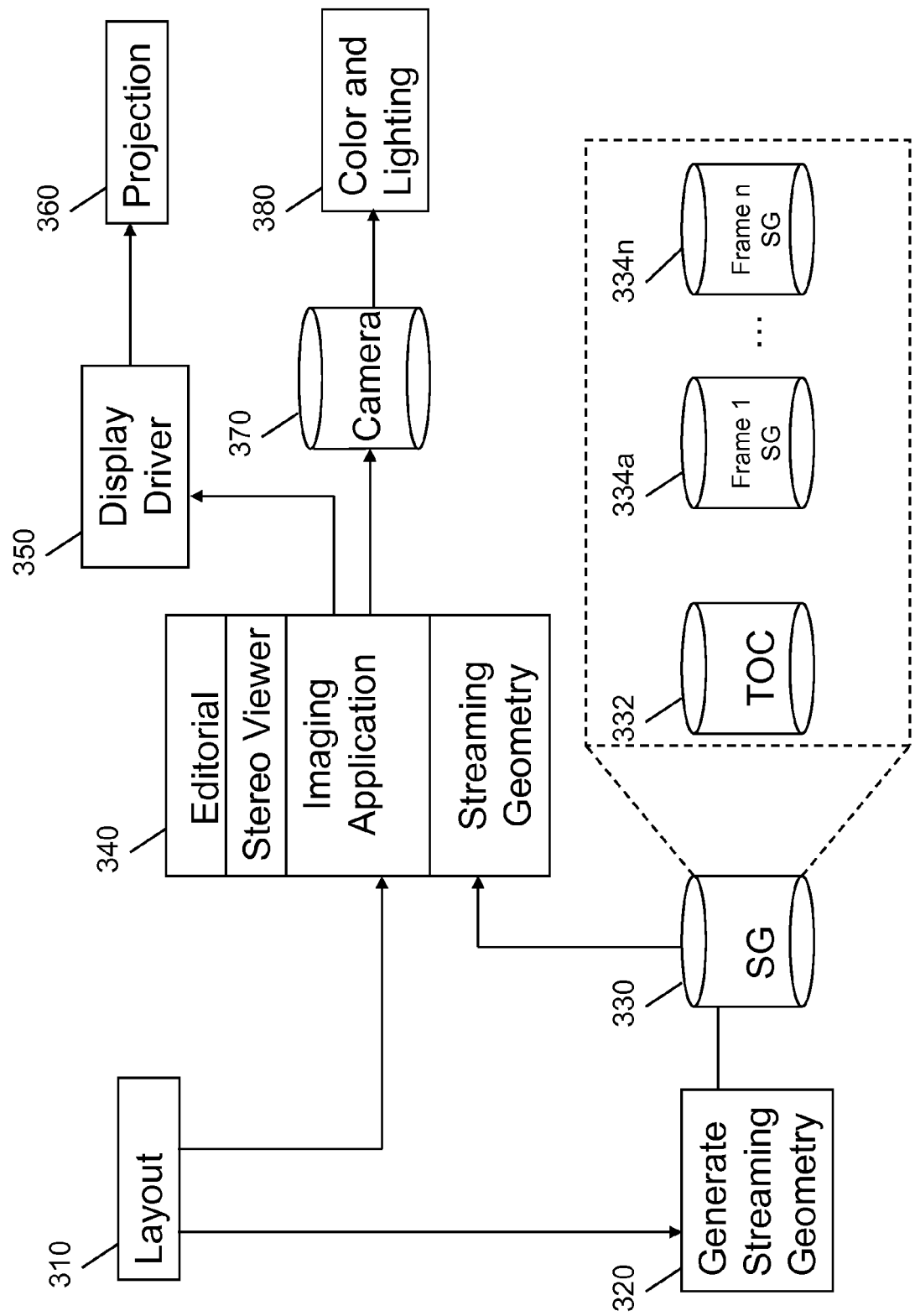
FIG. 3 illustrates an exemplary embodiment of an environment within which the methods and apparatuses for viewing and editing of 3D imagery are implemented, according to one or more embodiments.

FIG. 3 illustrates the overall environment involved in real time viewing and editing of 3D imagery or images according to several embodiments of the present invention. Layout 310 is provided as an input into a processor-based device executing software application to generate geometry data (320) corresponding to the digital video data of layout 310. One embodiment of the process of generating the geometry data (320) is described in detail below with respect to FIG. 4. The geometry data is output as a streaming geometry data file 330. In one embodiment, the streaming geometry file comprises a plurality of geometry data files 334a-n and a table of contents 332. In one embodiment, each geometry data file 334a-n corresponds to a shot within a sequence of shots corresponding to the layout and animation data 310. The streaming geometry data file 330, along with the layout 310 is input into a video display application 340, such as a customized version of Maya® by Autodesk®. In one embodiment, the layout and animation data 310 comprises digital data corresponding to a 2D movie or scene data. The digital data may represent live action movie footage and/or computer generated (CG) image or scene data.

The imaging application 340 comprises logic for processing the layout 310 and the geometry data within streaming geometry data file 330 to generate, display and edit 3D imagery. In some embodiments, the layout 310 is used to generate stereo cameras. In one embodiment, the generated stereo cameras and geometry data of geometry data file 330 are used to generate 3D imagery. In one embodiment, the 3D images are generated and displayed in real-time or near real-time. In one embodiment, one or more shots, or a sequence of shots represented by the 3D imagery are displayed in real-time or near real-time. For example, in one embodiment the 3D images are generated and displayed at a rate of at least 10 frames-per-second in stereo without performing an offline rendering process. Display in stereo is understood to be double the display rate in mono. In another embodiment, the 3D images are generated and displayed at a rate of at least 20 frames-per-second in stereo. In some embodiments, the 3D imagery is played back in a stereoscopic manner at the real time rate of 24 frames-per-second in stereo. In one embodiment, the rate at which the data is generated and displayed is dependent upon the bandwidth of the graphics card at the 3D layout processing application or other imaging application. In some embodiments, the rate at which the animation data is played back may depend upon the bandwidth of the external memory drive streaming the data to the 3D layout processing application or other imaging application. In one embodiment, the rate at which the data is generated and displayed depends upon the resolution of the geometry represented by the Layout 310. In some embodiments, the application 340 displays the 3D imagery through the display driver 350. In one embodiment, the user is capable of viewing the 3D imagery without an offline rendering process, and interactively editing the depth of the 3D images. In one embodiment, the application 340, outputs a camera file 370. In one embodiment, the camera file 370 comprises representation of the 3D imagery corresponding to frames within a sequence of shots.

In an exemplary embodiment, the integration of a very efficient streaming geometry system allows the importing of entire sequences of shot animation from the film into the imaging application 340, such as a 3D layout processing application, along with an interface to navigate between shots. Effectively, in one or more embodiments, an interactive session which mirrors all of the information from the Avid® cut of the film is generated. The integration of the streaming geometry data allows for near real-time playback of geometrically complex sequences from the film.

Figure 4:
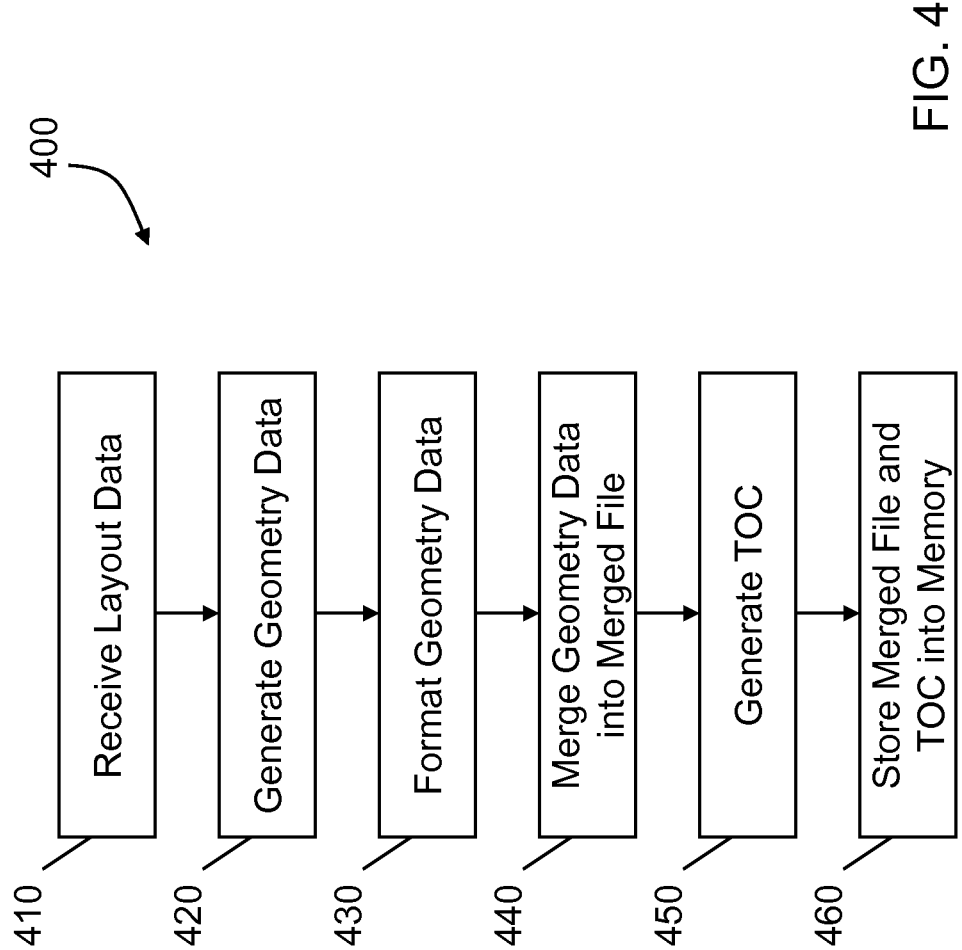
FIG. 4 illustrates a flow diagram of a method for generating geometry data, according to one or more embodiments.

Referring next to FIG. 4, a method of generating the geometry data as employed, for example, by the application 320 is illustrated. In step 410, the application receives layout data, such as scene data or animation scene data. In one embodiment, the layout data comprises deformable geometry data for one or more objects. Next, in step 420 the layout data is used to generate geometry data for one or more objects represented within the layout data. In one embodiment, step 420 comprises detecting the components represented within each frame of a sequence of shots corresponding to the digital layout data of the layout. Further, in such embodiments the geometry data may be generated for those components that are dynamic objects. That is, in one or more embodiments, geometry data is generated for those objects represented within the data of the layout that are in motion during the shot or sequence of shots. In such embodiments, the fixed components of the frames and shots within the sequence may be ignored, or forwarded as they were originally provided by the layout as input.

Next in step 430, the geometry data generated in step 420 is formatted. In one embodiment, the geometry data is packaged such that it is adapted to be mapped directly into graphics memory of an imaging application, such as a 3D layout processing application. In one embodiment, for example, the geometry data is texturized, applying texture and colors to all points that are to be mapped into graphics memory for the generated geometry data. Additionally, in one or more embodiments, the geometry data is aligned into 512 or 1024 Kilobyte sized blocks or pages. In some embodiments, such formatting allows the geometry data to be copied directly into graphics memory of an imaging application and/or system without requiring that the data be aligned or processed when being used to generate images and displayed. In several embodiments, the process of formatting the geometry data is parallelized such that the same format scheme is used for each geometry data. In one embodiment, the formatting results in each object being written out into a highly optimized format. In one embodiment, the geometry data is formatted in a manner that allows for transferring the data to an imaging system, such as a 3D layout processing system, in a streaming manner.

Then, in step 440, the geometry data is merged into files. For example, in one embodiment the highly optimized data is merged into files such that the file includes formatted geometry data for a plurality of objects represented in a frame within the sequence of shots corresponding to the digital video data of the layout. In such embodiment, geometry data corresponding to all dynamic objects within a frame is included within a single merged file. Accordingly, in one exemplary embodiment, after step 440 a number of merged files are generated, wherein the number of merged files is equal to the number of frames within the sequence of data represented by the data from layout.

Next, in step 450, a table of contents is generated. In one embodiment, step 450 is performed simultaneously with step 440. In another embodiment, the table of contents (TOC) is generated after the geometry data is merged into one or more files in step 440. In several exemplary embodiments, the table of contents (TOC) includes location data corresponding to the location of the geometry data for individual objects within a merged file, and further includes the location of the geometry data with relation to other merged files. In some embodiments, for example, the table of contents may include the location of the object in terms of the frame number in which the object appears, as well as the location of that object within the merged file that represents the specific frame.

Next in step 460, the merged files and the table of contents are written into a memory device for later retrieval by an imaging application. For example, the merged files and the table of contents (TOC) may be written into a disk, or a Redundant Array of Independent Disks (RAID) disk drive.

Figure 5:
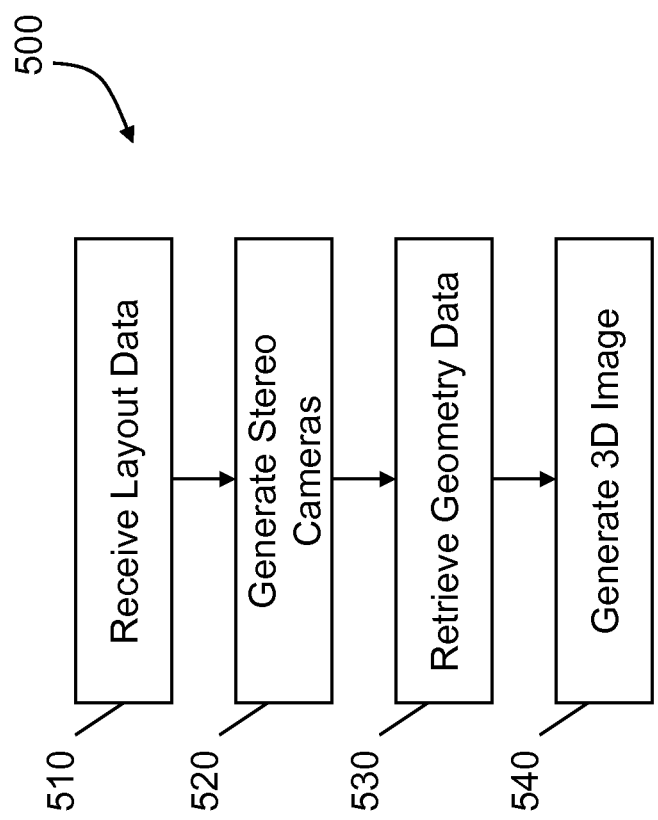
FIG. 5 illustrates a flow diagram of a method for generating and displaying 3D imagery, according to one or more embodiments.

Referring next to FIG. 5, a general method of generating and displaying 3D imagery is illustrated. In step 510 layout data, corresponding to a layout in a movie production pipeline is received. In one embodiment, the layout data comprises digital data corresponding to a 2D movie or image data. The digital data may represent live action movie footage and/or computer generated (CG) image or scene data. In one embodiment, the layout data comprises data corresponding to a layout camera. In the event that the layout data corresponds to live action footage, the camera corresponds to a real life camera used to capture the footage. In another embodiment, where the layout digital scene data corresponds to CG images, the camera may be a virtual camera used to create the CG images. In some embodiments, the CG camera is generated according to well-known methods of camera generation known in the art. In one embodiment, the layout camera is a read only camera, and accordingly the characteristics of the layout camera are fixed and cannot be edited. In one embodiment, the layout data comprises animation data corresponding to a sequence of shots. In step 520, a stereo camera is generated based on the digital layout data and the layout camera. In some embodiments, the stereo camera comprises a pair of a left camera and a right camera. In one embodiment, the left camera and the right camera are editable. One method of generating stereo cameras is described in more detail below with regard to FIG. 6.

Next, in step 530 geometry data corresponding to the video data is retrieved. In one embodiment, the geometry data is stored in an external memory device and retrieved in a streaming manner. In some embodiments, the streaming geometry data is generated and formatted in the manner described above with respect to FIG. 4. Next, in step 540, 3D imagery corresponding to the video data is generated using the generated stereo cameras, and the geometry data. The method of generating 3D imagery or images is described in more detail with respect to FIG. 8.

In some embodiments, during the process 500, additional geometry data may be generated for the fixed aspects of the frames represented within the sequence of shots represented by the layout data. For example, in one embodiment, the geometry data retrieved in step 530 is geometry data corresponding to aspects of the images of the layout data that are in motion throughout the sequence, while additional geometry data corresponds to aspects of the images that are not in motion. For example, if an object within a frame or sequence is defined within the layout data as changing location within a frame, the geometry corresponding to that object within the frame is pre-generated and stored within the external memory device for retrieval in step 530. However, for the aspects of the frame, for example the background scenery, which are not in movement in the frame, geometry data is generated during the process 500 and cached into local memory at the device executing the application performing process 500. In some embodiments, the 3D images are generated in step 540 using the generated stereo cameras, the geometry data retrieved from an external memory device, and the additional geometry data. In one embodiment, the 3D imagery is displayed to the user in stereoscopic manner in real time or near real-time.

Figure 6:
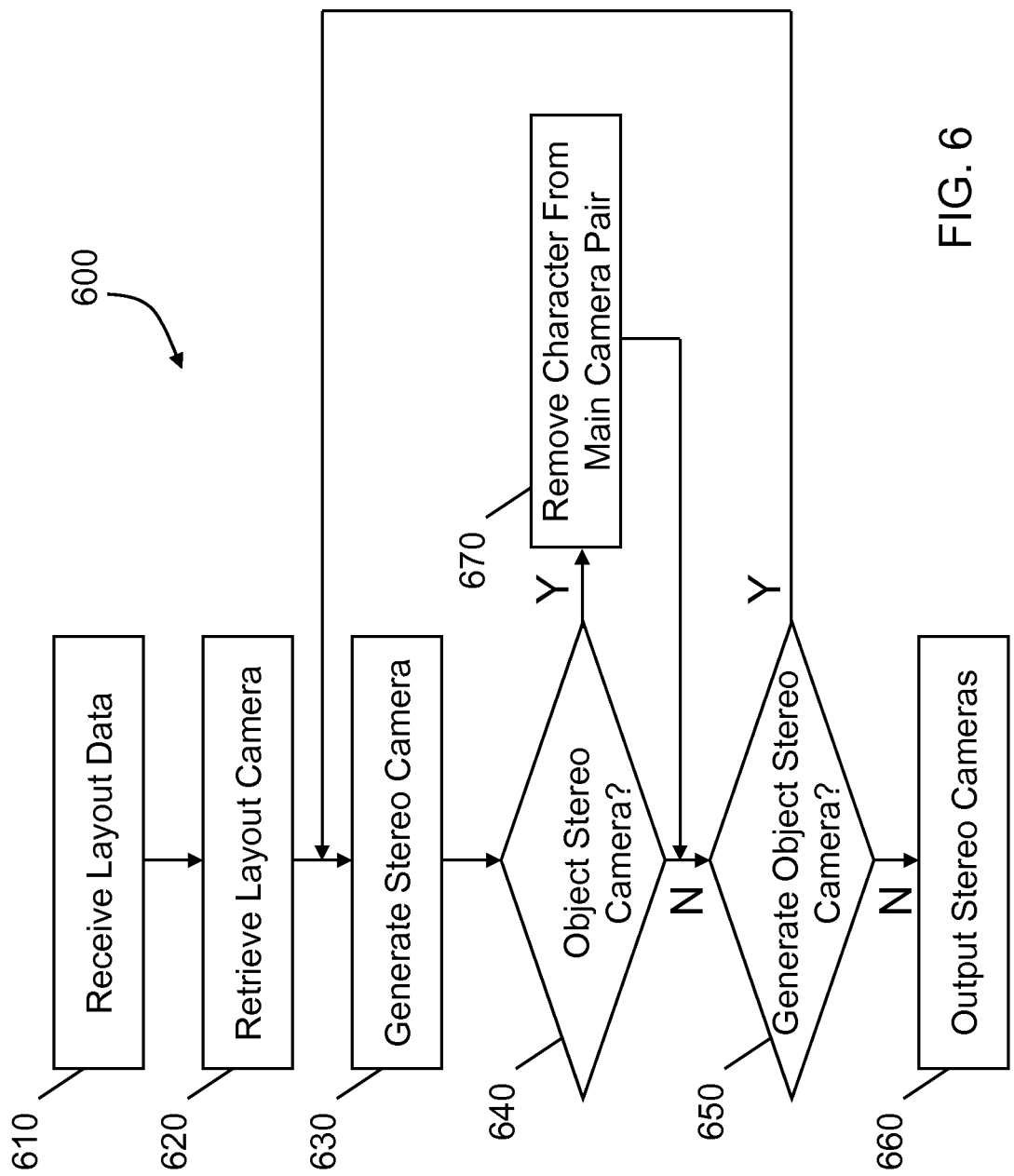
FIG. 6 illustrates a flow diagram of a method for generating stereo cameras, according to one or more embodiments.

FIG. 6 illustrates the method of generating stereo cameras according to some embodiments. In step 610, layout data corresponding to a layout in a movie production pipeline is received. In one embodiment, the layout camera is a read only camera, and accordingly, the characteristics of the layout camera are fixed and cannot be edited. In one embodiment, the layout data comprises digital data corresponding to a 2D movie or image data. The digital data may represent live action movie footage and/or computer generated (CG) image or scene data. In one embodiment, the layout data comprises data corresponding to a camera. In the event that the layout data corresponds to live action footage, the camera corresponds to a real life camera used to capture the footage. In another embodiment, where the layout digital scene data corresponds to CG images, the camera may be a virtual camera used to create the CG images. In some embodiments, the CG camera is generated according to well-known methods of camera generation known in the art. In one embodiment, the layout data comprises animation data corresponding to a sequence of shots representing a movie title. In step 620, the data corresponding to the layout camera is retrieved.

Next in step 630, a stereo camera is generated corresponding to the scene data and based on the layout camera. Generally, the stereo camera comprises at least a right camera and a left camera often referred to as the left eye and the right eye. In some embodiments, the left camera and the right camera are editable. In another embodiment, the stereo camera may further include a center camera. In one embodiment, the layout data corresponds to a sequence of shots corresponding to a movie title. In some embodiments, the stereo camera is assigned to a shot within the sequence.

In step 640, it is determined whether the generated pair of cameras is the main stereo camera or alternatively, whether the stereo camera is a camera assigned to a specific object. That is, whether the stereo camera is the pair of cameras assigned to the shot or an additional stereo camera assigned to a specific object or group of objects within the shot. When it is determined that the generated pair of cameras is the main stereo camera assigned to the shot the process continues to step 650.

In step 650, it is determined whether an additional stereo camera should be generated for a specific object represented within the layout data. In the event that in step 640 it is determined that an additional stereo camera should be generated, the process returns to step 630 to generate a second pair of a left camera and a right camera. In some embodiments, the right camera and the left camera are editable. In one embodiment, generating a pair of a left camera and a right camera comprises generating a generic pair of cameras and assigning a specific object or a number of objects to the camera.

Alternatively if it is determined that no additional cameras are to be generated, the process continues to step 660, wherein the resulting stereo cameras are outputted. In one embodiment, the layout data corresponds to a series of shots within a sequence corresponding to all or a portion of a movie title. In some embodiments, at least one main stereo camera may be generated for each shot within the sequence of data corresponding to the layout.

Returning to step 640, in the event it is determined that the generated stereo camera is not the main stereo camera; the process continues to step 670. In step 670 the object corresponding to the generated stereo camera is removed from the objects assigned to the main stereo camera, such that the main stereo camera corresponds to objects represented within a shot except any objects represented by a separate stereo camera.

Figure 7:
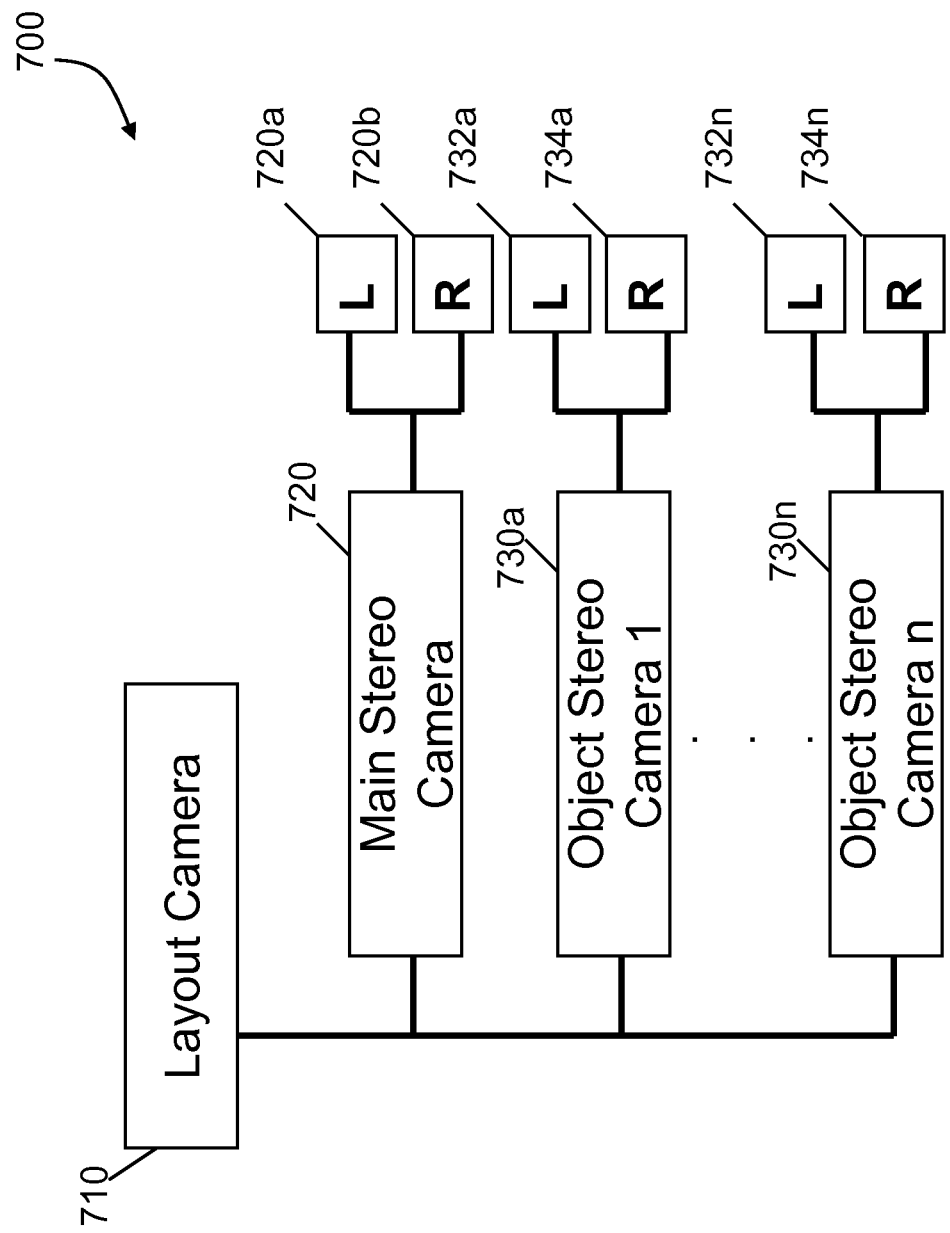
FIG. 7 illustrates an exemplary view of a group of stereo cameras assigned to video data, according to one or more embodiments.

FIG. 7 illustrates an exemplary output of the process 600. The layout camera 710 is used to generate main stereo camera 720, and additional stereo cameras 730*a-n*. As shown in FIG. 7, each of the stereo cameras 720 and 730*a-n* comprise at least a left camera 720*a*, 732*a-n* and a right camera 720*b*, 734*a-n*. In one embodiment, additional stereo cameras can be generated for each object represented within the shot. Alternatively, in another embodiment, all of the objects represented within a shot are assigned to the main stereo camera 720, and no additional stereo cameras are generated.

In some embodiments, objects or characters may be assigned to different stereo cameras and the individual cameras could be dialed independently. In one exemplary embodiment, the user may be provided with a display of all of the details of the multiple stereo cameras within a display mechanism. In one embodiment, the display mechanism may be the same display mechanism on which 3D imagery is displayed stereoscopically according to one or more embodiments.

For example, according to one embodiment, a typical shot would place the left-eye camera in the same position as the original 2D camera, simply creating a new right-eye camera. In some instances, this can be reversed, for example, if the right eye camera intersects an object or if it would aid in re-projecting elements. In another example, two new cameras may be created if the shot composition would be compromised by only offsetting to one side. In some embodiment, all camera parameters can be animated.

Figure 8:
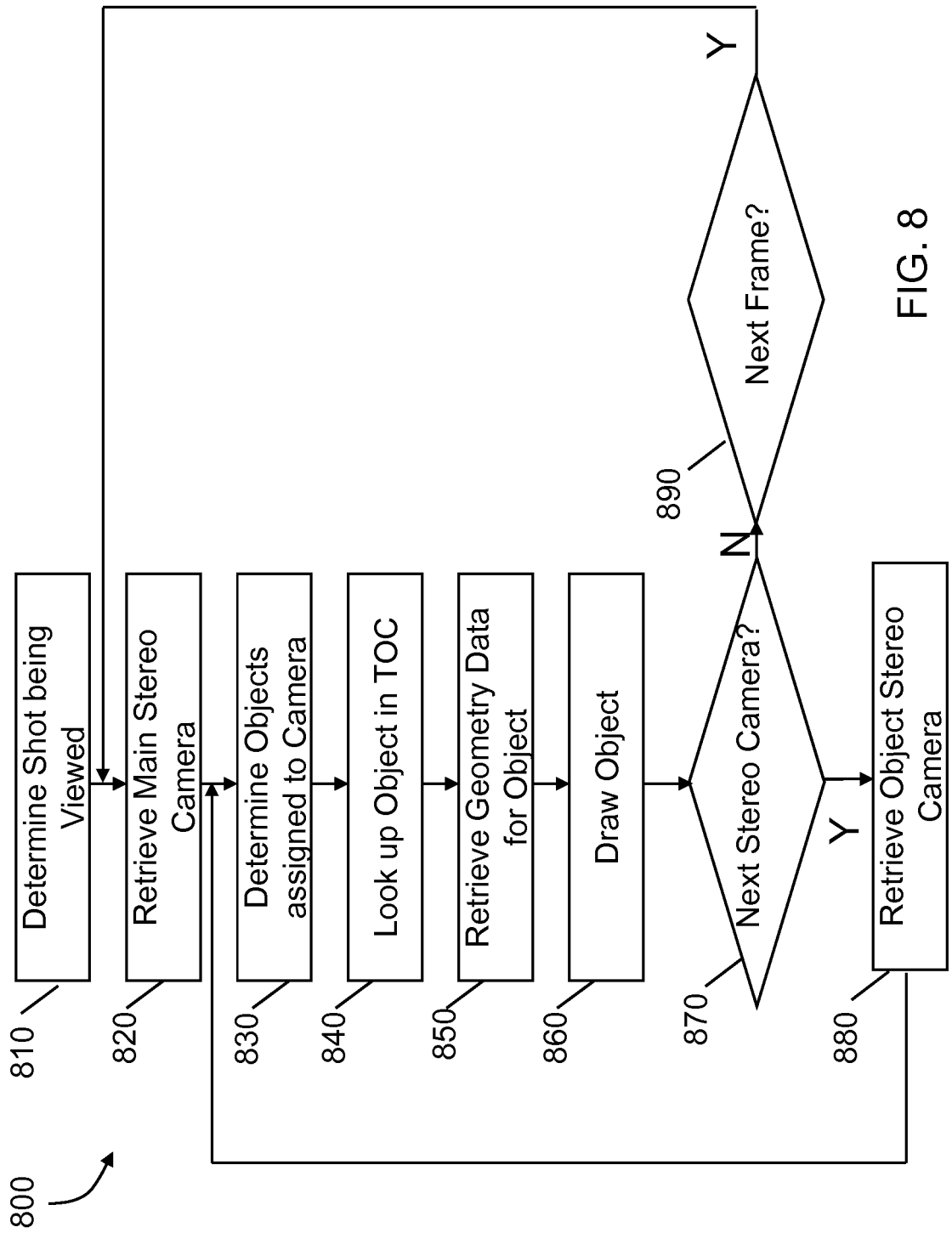
FIG. 8 illustrates a flow diagram of a method for generating 3D display imagery, according to one or more embodiments.

Referring next to FIG. 8, a method of generating the 3D imagery is illustrated according to several embodiments. Initially, in step 810 it is determined which shot is being viewed. In one embodiment, all of the shots making up a sequence representing a movie title or a portion of a title are displayed in order in stereoscopic manner. For example in one embodiment, process 800 begins with the first shot of the sequence of shots representing a movie title or a portion thereof. In some embodiments, the number of shots of the sequence are available on an edit list.

In one embodiment, the edit list is stored in the memory of the local machine executing the 3D layout processing application or other imaging application performing process 800. In one embodiment, the edit list is stored in remote memory, and retrieved before process 800 begins to be stored on the local memory of the device. In another embodiment, the edit list may be generated by the local device based on the layout data received at the machine executing the imaging application. When it is determined which shot is being viewed the stereo cameras assigned to the shot being viewed are retrieved in step 820. For example, in one embodiment, the stereo cameras retrieved in step 820 may be similar to those displayed in FIG. 7.

In step 830, one or both of the left and the right cameras of the stereo camera assigned to the overall shot are selected. In one embodiment, only the left camera is selected if the 3D layout processing application or other imaging application is only drawing the left eye. In another embodiment, the right camera is selected in the event that only the right eye is being generated. In another embodiment, where both cameras are being used to draw, both the left and the right camera of the stereo camera are selected. For example, referring again to FIG. 7, the process selects the left camera 720*a* and/or the right camera 720*b* of the stereo camera 720.

The process then continues to step 830 where it determines which objects within the shot are assigned to the camera selected in step 820. For example, in this step the process determines which objects are assigned to left cameras 720*a*, 732*a-n* and/or the right cameras 720*b*, 734 *a-n* of the stereo camera 720. Once it is determined which objects are assigned to the shot, in step 830, each object is looked up in a table of contents (TOC). In one embodiment, the table of contents (TOC) is a file received from an external memory device. For example, in one embodiment the table of contents may be stored on a RAID disk drive and received as an input at the application performing the process of FIG. 8. In one embodiment, the table of contents is stored in local memory of the machine executing the imaging application performing process 800. In an exemplary embodiment, the table of contents (TOC) includes location data corresponding to geometry data files stored on an external memory device. In some embodiments, the table of contents (TOC) is stored in a database format.

In one embodiment, the external memory device contains a geometry data file for each shot of a sequence of shots corresponding to a layout of a movie title or a portion thereof. In some embodiments, the geometry data file is the merged file such as the merged file described in FIG. 4. In some embodiments, the geometry data is stored in a highly optimized format such that the geometry data can be paged directly into the memory of the video display application performing the process 800. For example, in one embodiment, the geometry data is stored in 512 or 1024 KB pages that can be directly copied into graphics card memory without requiring any aligning or processing from the CPU of the machine hosting the 3D layout processing application or other imaging application performing the process 800. In one embodiment, the table of contents includes information regarding the specific frame within the shot that the object appears on and the location of the geometry data for the specific object. In one embodiment, the process begins from the first frame in the shot and retrieves the geometry data for the objects within that frame.

Next, in step 850 geometry data is retrieved for each object represented by the selected stereo camera is copied into local memory in a streaming manner. As described above, in one or more embodiments, the steaming geometry data is formatted such that it can be directly copied into the graphics card memory and is ready to be used by the graphics card memory without requiring any processing or aligning. For example, in one embodiment, VBO (vertex buffer object) is used to copy the geometry data from external memory into the graphics card memory used by the 3D layout processing application or other imaging application performing process 800. Next, in step 860 the streaming geometry data is used to dial the stereo cameras to draw each object. In some embodiments, the streaming geometry data for each object is copied into graphics memory, and is used to draw the object in 3D format using the left and/or right camera. In one embodiment, the streaming geometry code is used to dial the cameras retrieved in step 820 and generate the 3D representation of the object.

Next, in step 870 it is determined whether additional stereo cameras representing other objects within the specific frame of the shot being viewed exist. In the even it is determined that additional stereo cameras representing objects exit, the process then moves to step 880, where the stereo camera for the specific object is retrieved. In one embodiment, only the left camera is selected if the 3D layout processing application or other imaging application is only drawing the left eye. In another embodiment, the right camera is selected in the event that only the right eye is being generated. In another embodiment, where both cameras are being used to draw, both the left and the right camera of the stereo camera are selected. For example, referring again to FIG. 7, the process selects the left cameras 732*a-n* and/or the right cameras 734*a-n* of the stereo cameras 730*a-n*.

Next, the process returns to step 830 and steps 830-870 are repeated for each object stereo camera assigned to a specific frame of the shot being viewed. In the event it is determined that all stereo cameras objects for the frame have been processed, the process moves to step 890, where it is determined whether a next frame within the shot being currently viewed needs to be processed, and the steps 820-890 are repeated for each frame within the shot being viewed. If alternatively it is determined that all of the frames for the specific shot being viewed have been processed, process 800 ends at step 890 and the resulting 3D imagery is provided as output.

In one embodiment, the resulting 3D imagery is displayed at a user display unit of the processor-based system executing the 3D layout processing application or other imaging application performing the process 800. In another embodiment, the imagery is displayed at a display unit on a remote device.

In some embodiments, the process is repeated for all frames within a shot, and for all shots within the sequence of shots corresponding to a layout inputted into the 3D layout processing application or other imaging application. In one embodiment, for example, the shots correspond to a movie title or a portion thereof. In some embodiments, the 3D images are generated and displayed in stereoscopic manner according to the above describe methods in real-time or near real-time. For example, in some embodiments the 3D images having temporal characteristics are generated and displayed in stereoscopic manner according to the above-described methods at a rate of at least 10 frames-per-second, and in some embodiments, at least 20 frames-per-second. In another embodiment, the 3D images are generated and displayed at a rate of 24 frames-per-second in stereo.

In some embodiments, during the process 800, additional geometry data may be generated for the fixed aspects of the frames represented within the sequence of shots represented by the layout data. For example, in one embodiment, the streaming geometry data retrieved in step 850 is geometry data corresponding to aspects of the images of the layout data that are in motion throughout the sequence, while additional geometry data corresponds to aspects of the images that are not in motion. For example, if an object within a frame or sequence is defined within the layout data as changing location within a frame, the geometry corresponding to that object within the frame is pre-generated and stored within the external memory device for retrieval in step 530. According to some embodiments, for the aspects of the frame, for example the background scenery, which are not in movement in the frame, geometry data is generated during the process 800. In some embodiments, the additional geometry data generated may be cached into local memory at the device executing the application performing process 800. In some embodiments, the additional geometry data is used to draw the fixed aspects of the frames within the sequence of shots corresponding to the layout data.

Figure 9:
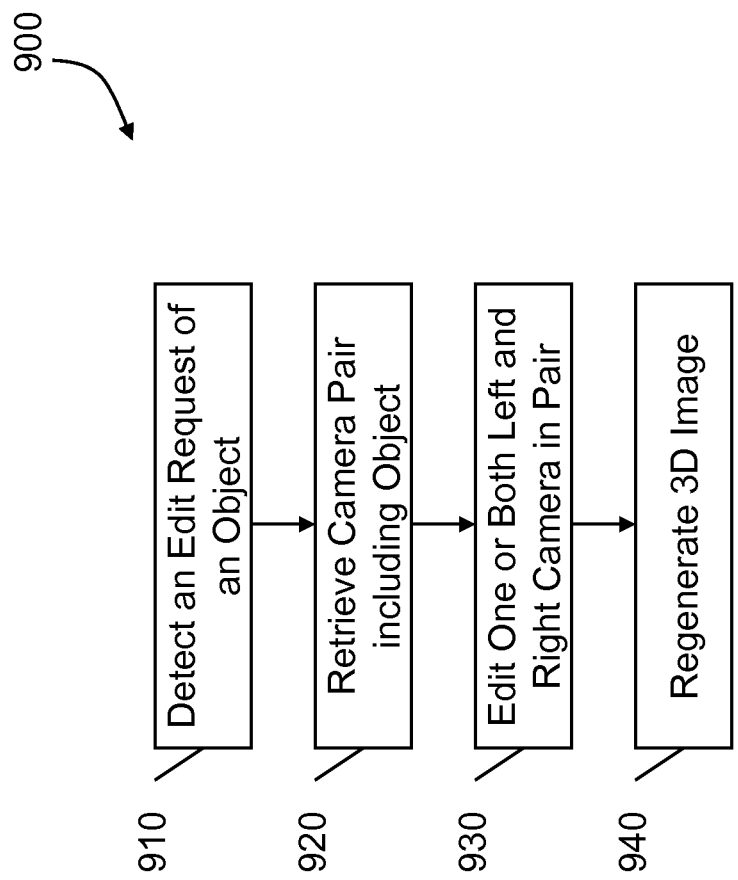
FIG. 9 is illustrates a flow diagram of a method for editing 3D imagery, according to one or more embodiments.

Next referring to FIG. 9, a method of editing 3D imagery according to several embodiments is illustrated. Initially, in step 910, a request to edit an object or frame is detected. For example, in one embodiment, a user selects a 3D character or object displayed within the 3D animated imagery, to be edited. For example, in one embodiment the user selects the object using a user display device. In some embodiments, the 3D images correspond to frames within a shot belonging to a sequence of shots. In one embodiment, the sequence of shots correspond to a movie title or a portion thereof. Once the edit request is detected in step 910, the process continues to step 920. In step 920, it determined which stereo camera is assigned to the selected object or image. In one embodiment, the object is assigned to a specific stereo camera. In an alternative embodiment, the object is assigned to a main stereo camera along with other objects displayed in the 3D image. In one embodiment, the stereo camera comprises a left and a right camera. Furthermore, during step 920 the camera assigned to the selected image or object is retrieved.

Next, in step 930 one or more properties of one or both of the left and/right camera of the stereo camera are edited to modify the 3D image such that it provides the desired illusion of depth for the viewer. In one embodiment, for example, the properties of the one or both cameras are edited according to user input. In some embodiments, a list of editing options may be displayed to the user and the user may select one or more of the editing options. In a further embodiment, a list of properties of the cameras may be displayed and the user may be able to modify or edit the displayed properties of the one or both cameras. In some embodiments, the properties may include convergence, and or interocular offset of one or both of the left or right cameras of the stereo camera assigned to the selected one or more objects. In one embodiment, editing the properties of the cameras will modify the depth and roundness of the image, or the depth and roundness of specific objects within the image. In one embodiment, the user may also add certain effects to the object. For example, in one embodiment the user may adjust the look of the 3D image by using floating windows to adjust the manner in which the 3D image appears to the human eye.

Once the user has selected the properties and options desired by the user, the properties are stored with the camera. Next, the process continues to step 940 where the 3D imagery is regenerated according to the newly added options and modified stereo camera properties. In one embodiment, the 3D imagery is regenerated according to the process 800 described with respect to FIG. 8 above. In several embodiments, a user is able to interactively view and edit camera properties corresponding to 3D imagery corresponding to frames within a sequence of shots to improve the quality of the 3D imagery to create a more realistic display that is adapted to be viewed by the human eye without causing discomfort.

In one embodiment for every shot within the sequence representing a movie title or a portion thereof, camera interaxial spacing and convergence can be modified, for example, using multiple cameras to achieve the best 3D effect on each object in the scene. In some embodiments, the shot layout or camera focal length may also be modified.

In one embodiment, the user is further provided with a measuring plane when viewing the 3D imagery. According to one or more embodiments, the measuring plane allows the user to measure the depth of different objects within the displayed the 3D image. In some embodiments, the user can use this measuring plane to determine which aspects of the image should be modified to provide the optimal 3D experience.

In one embodiment, the measuring plane is generated using geometry that is positioned in 3D space in the 3D animated scene. In one embodiment, the user inputs the desired position of the plane. In one embodiment, this is done using a slider provided at the user display that indicates a selectable position in 3D visual depth to a viewer. The desired position of the plane along with certain camera information is then used to generate the plane in virtual 3D space. In one embodiment, the camera information comprises the camera position, camera focal length, etc. In some embodiments, the interaxial spacing between the right and left camera and the convergence is also used in generating the plane. In one embodiment, the information is input into a formula to determine the position of the plane within 3D space in terms of the distance of the plane from the camera, and the plane is imaged in 3D visual space according to the location data. Below is an exemplary embodiment of the formula that may be used in one embodiment to determine the position of the plane in virtual 3D space:

global float $s3dMaxFloat;
   float $occ_dstCM=SRCCAM.s3d_interaxial_spacing
   float $focalCM=SRCCAMSHAPE.focalLength/10.0;
   float $converge=SRCCAM.s3d_convergence;
   float
       $hfaCM=SRCCAMSHAPE.horizontalFilmAperture*2.54;
   float
       $vfaCM=SRCCAMSHAPE.verticalFilmAperture*2.54;
   float
       $hfoCM=SRCCAMSHAPE.horizontalFilmOffset*2.54;

```
float
    $vfoCM=SRCCAMSHAPE.verticalFilmOffset*2.54;
float $cv=($converge+PLANE.s3d_convergence_pos);
float $zmag=(Scv !=0.0) ? (($occ_dstCM*$focalCM)/
    ($cv*$hfaCM)) $s3dMaxFloat;
PLANE.scaleX=($hfaCM/$focalCM)*$zmag;
PLANE.scaleY=($vfaCM/$focalCM)*$zmag;
PLANE.translateX=($hfoCM/$focalCM)*$zmag;
PLANE.translateY=($vfoCM/$focalCM)*$zmag;
PLANE.translateZ=-$zmag;
```

In some embodiments, the measuring plane can cut through actual objects in the scene and therefore can be used to measure depth of objects in the scene. In one embodiment, this is due to the nature of the plane being generated from actual geometry data. Furthermore, in some embodiments, the user is able to look through a different camera and actually see the measuring plane moving through space. In one embodiment, the plane is displayed to the user on the main display displaying animation scene data at the desired depth.

Figure 10:
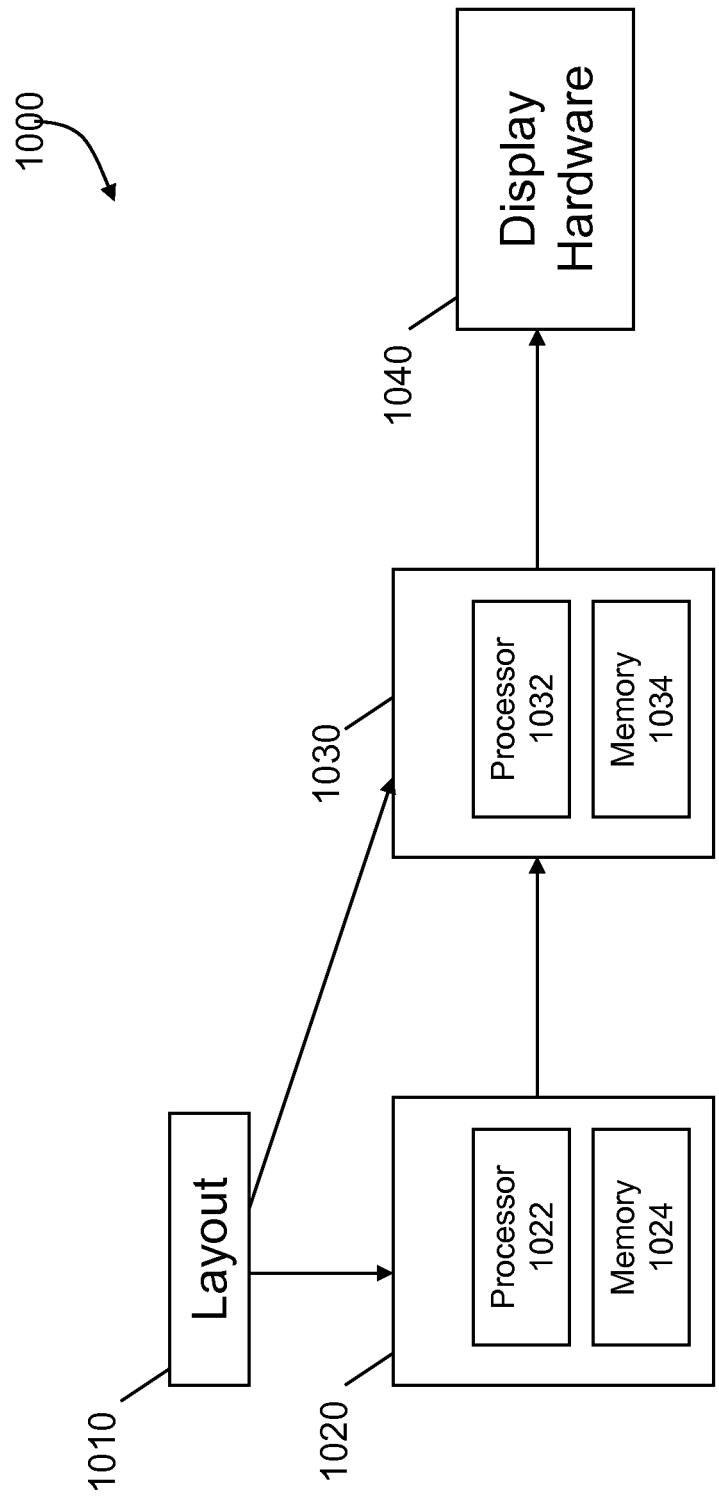
FIG. 10 illustrates an exemplary embodiment of an environment within which various methods are implemented according to one or more embodiments.

Next referring to FIG. 10, a general hardware environment in which the methods described above may be performed in some embodiments is illustrated. As displayed a layout 1010 of a video production pipeline is received and used as an input to computer systems 1020 and 1030. In some embodiments, the layout 1010 comprises deformable geometry data as well as animation data. In one embodiment each of the devices 1020 and 1030 are respectively configured to include a processor 1022 and 1032 coupled to a memory 1024 and 1034, such as random access memory. In some embodiments the memory 1024 and 1034 may be coupled to or comprise a computer-readable medium. In one embodiment, the processors 1022 and 1032 execute program instructions stored in the computer-readable medium. In some embodiments, the memory 1024 and/or 1034 may be coupled to one or more additional external or internal devices, such as, without limitation, a secondary data storage element, such as a database, a RAID disk drive, etc. For example, program code stored in the memory 1024 is executed by processor 1022 to generate the geometry data. In one embodiment, device 1020 receives layout data 1010 and generates geometry data corresponding to objects within the layout data. In one embodiment, device 1020 generates geometry data according to the method 400 described in FIG. 4. In one embodiment, the geometry data is then transferred to device 1030 in a streaming manner. In one embodiment, device 1030 receives the streaming geometry, as well as layout data 1010. In one embodiment, the device 1030 hosts 3D layout processing application or other imaging application 340 described above with respect to FIG. 3.

In one or more embodiments, the processor 1032 is configured to execute program instructions configured to generate, display and edit 3D imagery according to several embodiments described throughout this application. For example, in one embodiment the processor 1034 is configured to execute program instructions to generate 3D imagery according to FIG. 8. In some embodiments, the processor 1034 is further configured to allow interactive editing of 3D imagery according to FIG. 9. In one embodiment, one or both the devices 1020 and 1030 are similar to the processor based system 1100 according to FIG. 11 described below in more detail. In one such embodiment, the 3D imagery is displayed on the user interface 1160. Furthermore, in one embodiment the streaming geometry is received at the device 1030 through an external memory device 1170.

Figure 11:
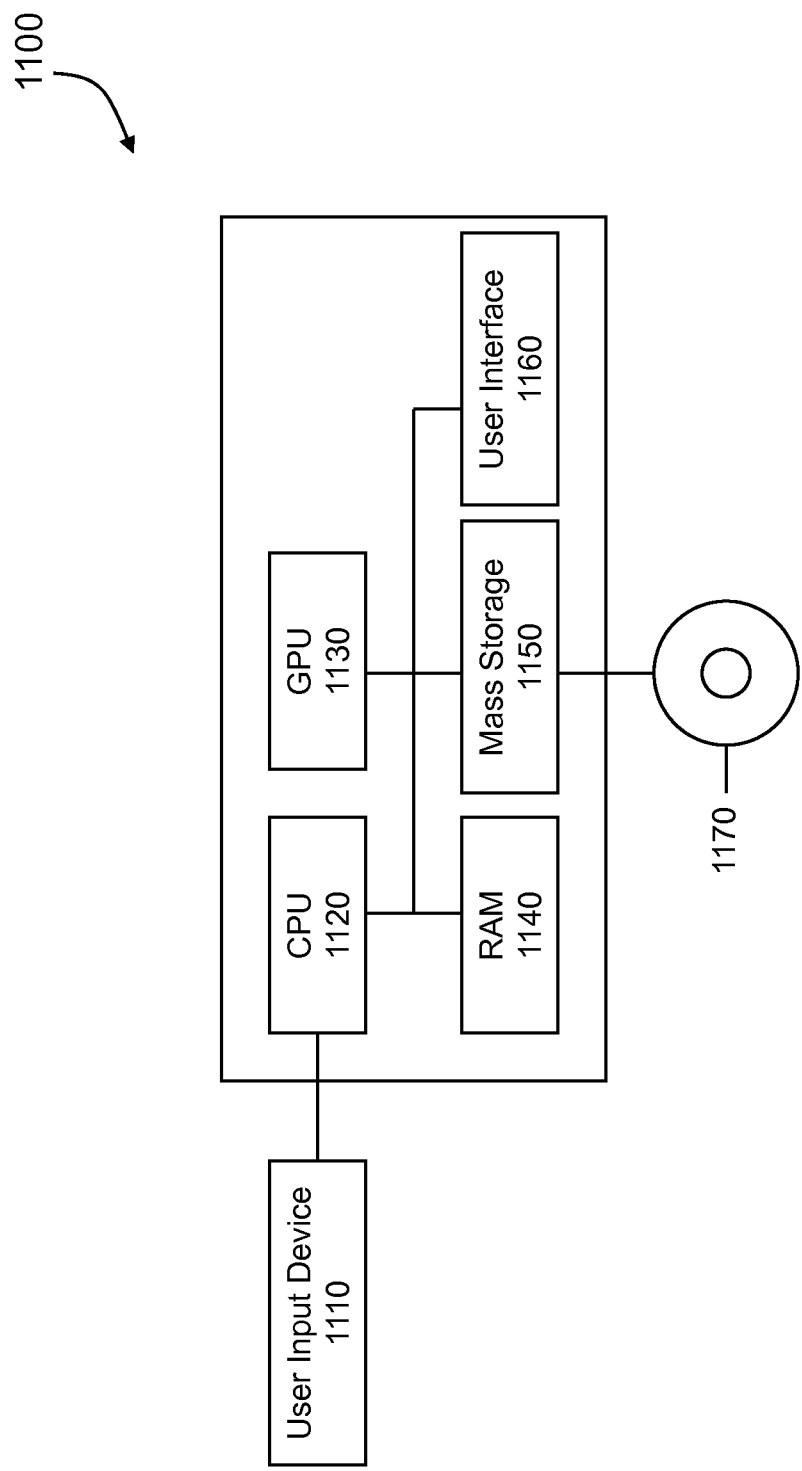
FIG. 11 illustrates a simplified block diagram of a processor-based system for implementing methods described according to one or more embodiments.

The methods and techniques described herein may be utilized, implemented and/or run on many different types of systems. Referring to FIG. 11, there is illustrated a system 1100 that may be used for any such implementations. One or more components of the system 1100 may be used for implementing any system or device mentioned above, such as for example any of the above-mentioned 3D layout processing application or other imaging application, geometry data generation system, etc. However, the use of the system 1100 or any portion thereof is certainly not required.

By way of example, the system 1100 may comprise a Central Processing Unit (CPU) 1120, a Graphic Processing Unit (GPU) 1130, a Random Access Memory (RAM) 1140, a mass storage 1150, such as a disk drive, and a user interface 1160 such as a display. The CPU 1120 and/or GPU 1130 may be used to execute or assist in executing the steps of the methods and techniques described herein, and various video content, including 3D images and 3D video content may be displayed on the user interface 1160 according to several embodiments described in the present application. The system 1100 may further comprise a user input device 1110. The user input device may comprise any user input device such a keyboard, mouse, etc. The system 1100 comprises an example of a device configured to execute the methods and processes described with respect to several embodiments described herein.

The mass storage unit 1150 may include or comprise any type of computer readable storage or recording medium or media. The computer readable storage or recording medium or media may be fixed in the mass storage unit 1150, or the mass storage unit 1150 may optionally include an external memory device 1170, such as a digital video disk (DVD), Blu-ray disc, compact disk (CD), USB storage device, floppy disk, RAID disk drive or other media. By way of example, the mass storage unit 1150 may comprise a disk drive, a hard disk drive, flash memory device, USB storage device, Blu-ray disc drive, DVD drive, CD drive, floppy disk drive, RAID disk drive, etc. The mass storage unit 1150 or external memory device 1170 may be used for storing code that implements the methods and techniques described herein.

Thus, external memory device 1170 may optionally be used with the mass storage unit 1150, which may be used for storing code that implements the methods and techniques described herein. However, any of the storage devices, such as the RAM 1140 or mass storage unit 1150, may be used for storing such code. For example, any of such storage devices may serve as a tangible computer storage medium for embodying a computer program for causing a computer or display device to perform the steps of any of the methods, code, and/or techniques described herein.

Furthermore, any of the storage devices, such as the RAM 1140 or mass storage unit 1150, may be used for storing any needed database(s). Furthermore, in some embodiments, the GPU may comprise a graphics card having local graphics memory, wherein the graphics card is employed in executing one or more of the steps of the methods and processes discussed herein. For example, in some embodiments, the streaming geometry data stored on for example external memory device 1170 is copied directly onto the graphics card memory and used to generate 3D images according to the methods described above with respect to several embodiments of the present invention.

In some embodiments, one or more of the embodiments, methods, approaches, and/or techniques described above may be implemented in a computer program executable by a processor-based system. By way of example, such processor based system may comprise the processor based system 1100, or a computer, entertainment system, graphics workstation, etc. Such computer program may be used for executing various steps and/or features of the above-described methods and/or techniques. That is, the computer program may be adapted to cause or configure a processor-based system to execute and achieve the functions described above. For example, such computer program may be used for implementing any embodiment of the above-described steps or techniques for generating streaming geometry data, and generating, displaying, and editing 3D images, etc.

As another example, such computer program may be used for implementing any type of tool or similar utility that uses any one or more of the above described embodiments, methods, approaches, and/or techniques. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein or any computer readable storage or recording medium known to a person of ordinary person skilled in the art.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein.

Several challenges should to be addressed in the successful production of stereoscopic motion pictures. The ideal goal of the 3D team is to make sure the film a deep and compelling experience, leaving the audience wanting more rather than tending a 3D-induced headache. That is, a unique aspect of 3D filmmaking is that, if done poorly, the film has the power to actually cause physical pain and nausea in an audience One challenge involves the system that will be used to present the film. For example, the film may be presented in an IMAX® system, a REAL D system, a Dolby® 3D Digital Cinema, for example. In order to prepare imagery for presentation in both IMAX® and digital 3D systems, the film can be shot with (mostly) parallel cameras and a post process then applied to introduce a divergence into the delivery of the digital 3D version. This fixed divergence can be calculated based on a 65 mm human interpupillary distance and assuming the film would be projected on a 40 foot screen (65 mm/40 feet"" 0.005). On smaller screens, the film simply wouldn't feel as deep into the screen. In some cases, the amount of this divergence can be an important constant that will be used throughout the film because it represents the amount of image parallax that would correspond to the screen for digital 3D presentation.

Another challenge is that in some cases, the film may need to account for theaters of differing screen sizes. A brief survey of 3D-capable digital theaters shows screen sizes that vary from 17-50 feet wide and projection throw from 50-180 feet. Assuming a seat in the middle of the theater, our survey yielded viewing angles in the range of 35-75 degrees. Thus, there is no such thing as the "typical multiplex theater." This is in contrast to IMAX® theaters, which are built around a much narrower specification of theater layout (75-80 degrees in the center). A further variability is that viewers can sit anywhere in the theater. Making a 3D film that is suitable to be played and enjoyed in this wide a variety of screening geometries presents an interesting challenge. If one were to create the material such that it can be enjoyed by patrons in the front row (dialing back the amount of screen parallax) you, effectively, reduce the overall depth of the entire film and make the film less enjoyable for people in the back row. Additionally, while a small amount of divergence is tolerable for most people, that small amount may become impossible to view for people sitting in the front row. In some cases, one solution is to minimize the cases in which divergence occurs, and not allow divergence for the primary subject of the shot (the object at which the audience should be looking) and generally compose the depth for the middle of the theater (60-75 degree field of view). This technique also works well for IMAX® presentation.

Another challenge that should be addressed for successful 3D film production involves limiting the effect of ghosting. Ghosting is a phenomenon that occurs when there is crosstalk between the left and right images, as perceived by the viewer. In a perfect 3D projection system, the left eye of the viewer would only see the left eye version of the film and likewise for the right eye. Unfortunately, there is no such thing as a perfect 3D projection system. As a result, in areas of high screen parallax, a faint double image can often be perceived resulting in confusion for the viewer. Areas of high parallax and high contrast are especially prone to ghosting. Films with low light scenes (indoor, at night) often exhibit a high degree of contrast due to the lack of ambient light and tend to result in more ghosting. To improve the effect of ghosting, one can reduce the parallax or reduce the contrast. For example, for scenes with high contrast, a bright object was placed close to the screen plane. However, often 3D artist do not have the freedom or it may be impractical to make all artistic changes that may be needed to reduce these effects. In some cases, some amount of ghosting may be acceptable.

For IMAX® presentations, ghosting may be especially problematic. For example, IMAX® uses a linear polarizer arrangement, which has the property that if the viewer tilts her head with respect to the screen, she would actually increase the amount of crosstalk. No viewer can keep their head perfectly upright for one and a half hours. Also, an IMAX® screen is usually quite large, leaving the amount of depth behind the screen as a very small percentage of the overall depth budget. If we were to restrict objects to the screen plane in an IMAX® presentation, there would be very little depth to the scene (unless divergence was allowed). Lastly, for an IMAX® presentation, the depth can be enhanced for some shots to make the experience even more intimate for their viewers. However, ideally, high contrast scenes should not be enhanced if possible since this may lead to more ghosting when the parallax was increased. Again, in some cases, in particular with IMAX® presentations, the effect of ghosting is ignored since options to correct are limited.

Another challenge is to limit the cardboard effect of objects in a scene. That is, viewers may feel that the characters feel "cut out" as if they are on cards which are separated in space. In some cases, this may be the result of the actual technique being employed in the creation of the film. In other cases, the experience can be attributed to a limited stereo budget for the 3D film. Ultimately, this "cardboard effect" is the result of individual characters not having enough internal depth or roundness. If the character doesn't feel round, the character may not feel real to the viewer. One solution to this problem is to isolate the individual characters and make their centers closer to the viewer than the edges. In camera terms, this means adjusting the inter-axial spacing of the cameras and convergence on a per-character basis rather than for the entire scene.

Furthermore, the choice of focal length of the shot camera can also have a very strong effect on the perception of roundness of a character. While a wide-angle lens can exaggerate the roundness of a foreground character, a narrow lens will tend to flatten objects out. In some cases, particularly those in which the characters interaction with the ground was visible onscreen, the focal length and position of the camera can be adjusted to achieve a good balance between overall scene depth and character roundness while preserving the intended composition. On a creative level, the roundness can be adjusted to subtly influence the viewers' perception of the power of characters. For example, characters in a strong position of power were given extra roundness when compared with weaker characters. In another example, a slightly wider inter-axial spacing can be used to emphasize the unreal aspect of a scene, such as a dream sequence. Of interest is the phenomenon that perception of roundness becomes enhanced the further away from the screen a viewer is seated. This is one of the many reasons why experienced 3D practitioners try to view from the back of the theater in a 3D screening.

Another challenge to consider is when the composition of a shot is such that objects in the foreground intersect the left and right edges of the screen, a phenomenon known as the "paradoxical stereo window effect" comes into play. For example, objects that appear in depth to be closer than the edge of the frame they intersect create confusion for the viewer. For example, when a close object intersects the right side of frame, without some form of correction, the viewer is able to see more of the object in the right eye than in the left. This experience runs counter to the normal experience of looking through a window in which the left eye would be able to see more than the right. A very simple solution to this problem was employed to move the edge of the frame closer to the viewer by imprinting a black band on the side of the frame in the appropriate eye. The black band effectively hides the portion of the image that wouldn't be visible if looking through a window. While use of this technique can avoid the visual paradox created by the edges of the frame, it also can be useful to subtly convey the context of a shot as well. For example, by moving the window closer to the audience than would be needed simply to correct the screen window paradox, one could convey, for example, a given shot was a character's point-of-view or to make a flat, far away shot feel deeper. This technique, dubbed the "floating window," can be important for the digital 3D presentations because most multiplex theaters have a very narrow angle of view, making the screen edges a distinct part of viewing the film. For an IMAX® presentation, the edges of the frame are less of an issue due to the wider angle of view.

Another challenge to consider is where the film was not designed for 3D. For example, there may be situations in which the choice of lens or framing would be less than ideal for 3D. In those situations, a shot can be recomposed if it is possible to remain faithful to the filmmaker's intention. For example, the field of view may be subtly widened in a shot to allow objects which intersect the edge of frame to have a more centered composition. Alternately, an individual character or object could be moved around in frame. In other cases, a distracting foreground object could be removed to allow the viewer an easier time focusing on the true subject of the shot.

Several of the embodiments described herein provide methods and systems that can be used in the generation of stereoscopic motion pictures. For example, animation scene data may be generated, displayed and edited in a manner that allows a 3D team to quickly and efficiently address one or more of the challenges present in 3D film production. According to several embodiments, one or more of these challenges may be addressed in an interactive approach when dialing cameras. An interactive approach such as provided by one or more embodiments of the invention, allows for more creative flexibility, while increasing the efficiency of the camera creation process. In some embodiments, the goal is to be able to visualize all aspects of the 3D film in a live, interactive session rather than requiring the iterative, pre-rendered approach. In some embodiments, multiple technologies are provided, which in one form are implemented as part of Autodesk® Maya® animation package. In one embodiment, software was developed to allow for the viewing of live sessions in a 3D theater to dial the camera parameters directly. Additionally, in one embodiment, methods and systems were provided to allow the importing of entire sequences of shot animation from the film into Maya® along with an interface to navigate between shots. Effectively, this can provide an interactive session which mirrored all information from an Avid® cut of the film. In some embodiments, a streaming geometry system was integrated to allow for near or actual real-time playback of geometrically complex sequences. In further embodiments, a viewer (for example, using the Maya® stereoscopic viewport) was developed that allowed the viewing of all of the details of our multi-camera rigs within the live viewer. In one implementation, objects or characters could be assigned to different virtual cameras and the individual cameras could be dialed independently.

According to some embodiments, the focus of the camera team can become more about preparing shot data and publishing the results of these live camera sessions. This can result in a smaller camera team with better creative results. In one example system using one or more methods of embodiments of the invention, for every shot, camera inter-axial spacing and convergence are adjusted. In some embodiments, multiple cameras are used to achieve the best 3D effect on each object in the scene. A typical shot could place the left-eye camera in the same position as the original 2D camera, and simply create a new right-eye camera. In some instances, this could be reversed (if the right eye camera intersected an object or if it would aid in re-projecting elements). In other cases, two new cameras could be created if the shot composition would be compromised by only offsetting to one side. In some embodiments, at this point, one can also choose to adjust the shot layout or change the camera focal length. Camera parameters can be animated, especially with long shots (e.g., on average 8.75 seconds) and with sweeping camera moves.

In a further application after using one or more of the embodiments, shot finishing may be used. For example, the job of the "shot finisher" may be to take the approved 3D cameras and the completed 2D shot assets and to produce a finished 3D version of the shot. The artist may start with the elements and composite script as created by the 2D production and build a new stereoscopic version of the shot. In one form, there is no situation was the left or right eye of the 3D shot was the same as the version found in the 2D film. In one case, a single composite script could represent both eyes with adjustments that are unique to each eye, including creative adjustments such as reduction of blur in the shot. A common technique in traditional filmmaking is to use a narrow and directed depth of field to focus the viewer's attention on a particular subject. In 3D filmmaking, a narrow depth of field can be distracting and inhibit the viewer from a truly immersive experience. To make the 3D film more effective, as much as 75% of the depth of field effect can be removed to sharpen the image in one or more shots. Since there are many other tools in filmmaking to direct the eye, other techniques may be applied (e.g., to brighten the subject) if the subject of the shot was no longer clear.

Then, in some cases, the artist may need to create depth for objects with no inherent 3D depth. The most common example of this is the use of 2D matte paintings. While most of the matte paintings may be painted in a 3D paint package in order to allow for camera moves, there may be many examples of traditional flat matte paintings. In cases where the matte painting only exists on a flat, painted card, image warping may be used to create depth. By selectively warping parts of the image in one eye—specifically, by giving areas which appeared closer to camera a larger amount of offset—a flat painting can appear to have depth in 3D. In some systems, artists can check their work in 3D in multiple ways. When at an artist's desk, the artist can use either anaglyph glasses or toggle between the two eyes in full color. For example, the artist may use a walk-up stereo workstation utilizing active shutter glasses. Furthermore, next, shots may be reviewed in a 3D theater for approval, e.g., a 3D theater equipped with a full cinema-quality REAL D projection system. Approval may include verifying that the shot looks good creatively as well as that it matches the depth of the approved camera and the look of the original 2D shot.

On the back end of the stereo pipeline, some embodiments use techniques to enable the shot-finishing artist to generate the second eye efficiently. For example, on average, in some cases, one can setup a shot and have elements processing on the render queue in under an hour.

As is common, compositing is used, which is node-based. This allows the use of transition nodes that have many behaviors that simplify a composite graph, define how upstream elements get processed, and determine how the elements get sent to the render farm. In some embodiments, a transition node also has the ability to switch between the different rendering methods that may be used to generate the second eye's element such as: re-projection, re-render, offset, image warp, pass-through, and other techniques.

Layered on top of the transition system in some embodiments, a project management interface is added that simplifies how the state of the transition nodes is set and manages how the elements are regenerated for the second eye. In one case, the transition node instructs the project management interface in how to generate the offset eye's element as well as how to process all elements including the dependency order for the task queuing system. This system can also notify the artist which elements are in need of processing and which elements have been completed. Heavy use of task automation means the artist can focus more time on the creative aspects of a shot.

It is noted that some may suggest that re-rendering the shot from the second camera is the most accurate method to produce elements. However, re-rendering is not always the most efficient process to generating the second eye. In one case, to improve efficiency, a re-projection system is used to duplicate the elements without the need to rerender them. This re-projection allows one to minimize the number of elements needing processing by pre-compositing whole branches of the composite graph before depth is applied. This process also brings render times down to minutes rather than the multiple hours it usually takes to generate the base elements and allows incorporation of composite tricks such as rotoscoped mattes and other image processing. Otherwise, such additions may not be easily mapped into the second eye without producing artifacts.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for use in the display of 3D imagery comprising:
    receiving at a processor-based system, a first set of data corresponding to an output from a layout in a production pipeline;
    generating via the processor-based system, geometry data for one or more objects represented within the first set of data;
    merging the geometry data for each of the one or more objects to create one or more merged files;
    generating a table of contents, wherein the table of contents specifies the location of the geometry data for each of the one or more objects within the one or more merged files; and
    storing the geometry data and the table of contents to a memory device for subsequent retrieval by a system running an editing software for editing stereoscopic 3D imagery;
    wherein the generating the geometry data step comprises identifying one or more objects in motion represented within the first set of data and ignoring fixed components of the first set of data and
    wherein the fixed components of the first set of data are forwarded to the system running the editing software as originally provided by the layout.

2. The method of claim 1, wherein the generating the geometry data step further comprises:
    generating the geometry data for each of the one or more objects; and
    formatting the geometry data for each of the one or more objects.

3. The method of claim 2, wherein the formatting the geometry data step comprises texturizing the geometry data for each of the one or more objects.

4. The method of claim 2, wherein the formatting the geometry data step comprises memory aligning the geometry data into fixed sized memory blocks.

5. The method of claim 4, wherein the fixed sized memory blocks are compatible with the size of memory blocks of a video display application that will utilize the geometry data.

6. The method of claim 1, wherein the first set of data comprises deformable geometry data corresponding to the objects represented within the first set of data.

7. The method of claim 1 further comprising formatting the geometry data into a first format matching a format used by an imaging application, wherein the storing the geometry data step comprises storing the geometry data in the first format.

8. The method of claim 1, wherein the geometry data is adapted to be directly copied from the memory device and into a graphics card memory of a video display device.

9. The method of claim 8, wherein the geometry data corresponds to one or more sequences of images and each merged file corresponds to a shot within a respective one of the one or more sequences.

10. The method of claim 9, wherein the generating the geometry data step comprises generating the geometry data for the one or more objects represented within the first set of data for one or more sequences, wherein the storing the geometry data step comprising storing the geometry data and the table of contents for the one or more sequences to the memory device for subsequent retrieval, the method further comprising:
outputting, after completion of the storing step, the geometry data to an imaging application for display.

11. The method of claim 1 further comprising outputting the geometry data in a streaming manner from the memory device to an imaging application.

12. A non-transitory tangible computer-readable storage medium storing a computer program, the computer program adapted to cause a processor based system to execute steps comprising:
receiving a first set of data corresponding to an output from a layout in a production pipeline;
generating geometry data for one or more objects represented within the first set of data;
merging the geometry data for each of the one or more objects to create one or more merged files;
generating a table of contents, wherein the table of contents specifies the location of the geometry data for each of the one or more objects within the one or more merged files; and
storing the geometry data and the table of contents to a memory device for subsequent retrieval by a system running an editing software for editing stereoscopic 3D imagery;
wherein the generating the geometry data step comprises identifying one or more objects in motion represented within the first set of data and ignoring fixed components of the first set of data and
wherein the fixed components of the first set of data are forwarded to the system running the editing software as originally provided by the layout.

13. The non-transitory tangible computer readable storage medium of claim 12, wherein the generating the geometry data step further comprises:
generating the geometry data for each of the one or more objects; and
formatting the geometry data for each of the one or more objects.

14. The non-transitory tangible computer readable storage medium of claim 13, wherein the formatting the geometry data step comprises texturizing the geometry data for each of the one or more objects.

15. The non-transitory tangible computer readable storage medium of claim 13, wherein the formatting the geometry data step comprises memory aligning the geometry data into fixed sized memory blocks.

16. The non-transitory tangible computer readable storage medium of claim 12, wherein the first set of data comprises deformable geometry data corresponding to the objects represented within the first set of data.

17. A system comprising:
a processor based system configured to execute a computer program that causes the processor based system to execute steps including,
receiving a first set of data corresponding to an output from a layout in a production pipeline;
generating geometry data for one or more objects represented within the first set of data;
merging the geometry data for each of the one or more objects to create one or more merged files;
generating a table of contents, wherein the table of contents specifies the location of the geometry data for each of the one or more objects within the one or more merged files; and
storing the geometry data and the table of contents to a memory device for subsequent retrieval by a system running an editing software for editing stereoscopic 3D imagery;
wherein means for generating the geometry data comprises means for identifying one or more objects in motion represented within the first set of data and ignoring fixed components of the first set of data; and
wherein the fixed components of the first set of data are forwarded to the system running the editing software as originally provided by the layout.

18. The system for claims 17, wherein the step of generating the geometry data further comprises:
generating the geometry data for each of the one or more objects; and
formatting the geometry data for each of the one or more objects.

* * * * *